United States Patent [19]

Österberg

[11] 4,437,017

[45] Mar. 13, 1984

[54] ARRANGEMENT FOR HYDROELECTRIC POWER PLANTS

[75] Inventor: Thomas V. Österberg, Växjö, Sweden

[73] Assignee: A-Betong AB, Växjö, Sweden

[21] Appl. No.: 347,491

[22] Filed: Feb. 10, 1982

[30] Foreign Application Priority Data

Feb. 11, 1981 [SE] Sweden .............................. 8100934

[51] Int. Cl.³ ........................ F03B 13/08; E02B 9/00
[52] U.S. Cl. ........................................ 290/52; 405/78
[58] Field of Search .............. 290/43, 52, 54; 405/78; 415/500; 60/398

[56] References Cited

U.S. PATENT DOCUMENTS 4,289,971  9/1981  Ueda .................................... 290/52
4,311,410  1/1982  Atencio ................................ 290/52

*Primary Examiner*—J. V. Truhe
*Assistant Examiner*—Shelley Wade

[57] ABSTRACT

Hydroelectric power plant containing a flow tube for the water, an inlet tube leading to the flow tube and a discharge tube leading from the flow tube. In the flow tube a turbine is arranged to be driven by the flowing water and which via a drive shaft drives an electric generator. Accentuated sub-divisioning as between mechanical unit and portions of an installation nature is provided. The turbine and generator are located in the direct vicinity of each other and together with the drive shaft form a unit which in its entirety is situate in the flow tube and arranged to be traversed by flowing water. The unit is so arranged that the turbine can be in contact with the water flow while the generator has a watertight enclosure into which the drive shaft extends through a watertight bushing. Furthermore an electric cable for transmitting the electricity produced is connected. The installation components, the said tubes, are made from prefabricated concrete components. The flow tube is essentially vertical and exhibits a support for the unit and, at its upper end, an aperture through which the unit can be lowered.

2 Claims, 3 Drawing Figures

ARRANGEMENT FOR HYDROELECTRIC POWER PLANTS

The present invention relates to an arrangement for hydroelectric power plants. With the increasing interest in renewable energy sources an attempt has been made to find ways of exploiting smaller hydroelectric resources to a greater extent, such as brooks and streamlets. However with installations of the type currently available it has proved difficult to achieve an acceptable economic return because the plant costs become so high that the capital costs are much too great in comparison with the desired investment and with the profit given by the energy produced. In this context it can be noted that the design of such installations is not matched to suit the smaller size, but instead mainly conventional technology is employed which has been adapted originally for larger installations in which priority attaches primarily to efficiency and secondly to plant costs. Thus use is made of a turbine which is specially designed and adapted to suit the head and flow rate involved, which is connected to a generator located in a machine room by means of a drive shaft.

The aim of the present invention is to provide such an arrangement for hydroelectric power plants that the plant costs can be reduced considerably as compared with conventionally designed hydroelectric power plants, whereby it becomes possible to exploit even smaller hydroelectric power resources.

BRIEF DESCRIPTION OF THE DRAWINGS

The appended drawings illustrate an embodiment of the invention which will be described in the following.

Thus FIGS. 1 and 2 illustrate two parts of the same plant and the part in FIG. 3 will come immediately after the part shown in FIG. 1, viewed in the direction of water flow.

DETAILED DESCRIPTION

Figure 1:
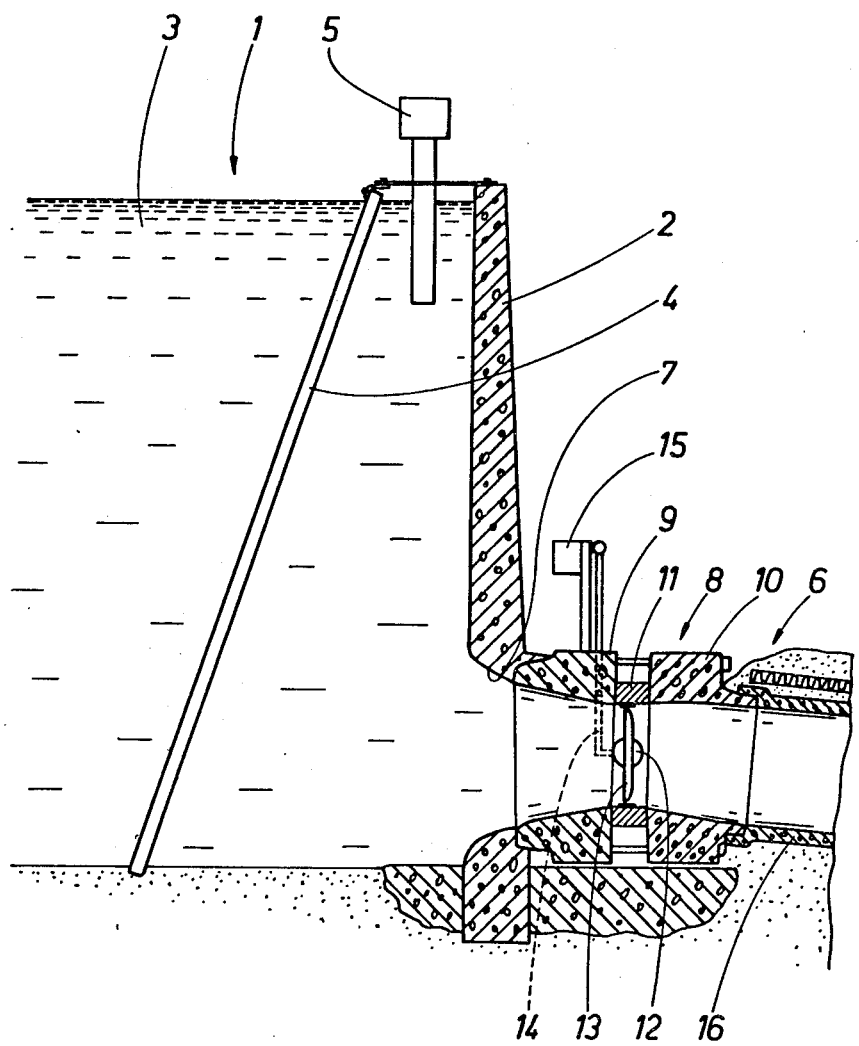
FIG. 1 shows a section of an intake portion of a hydroelectric power plant in accordance with the invention.
Figure 2:
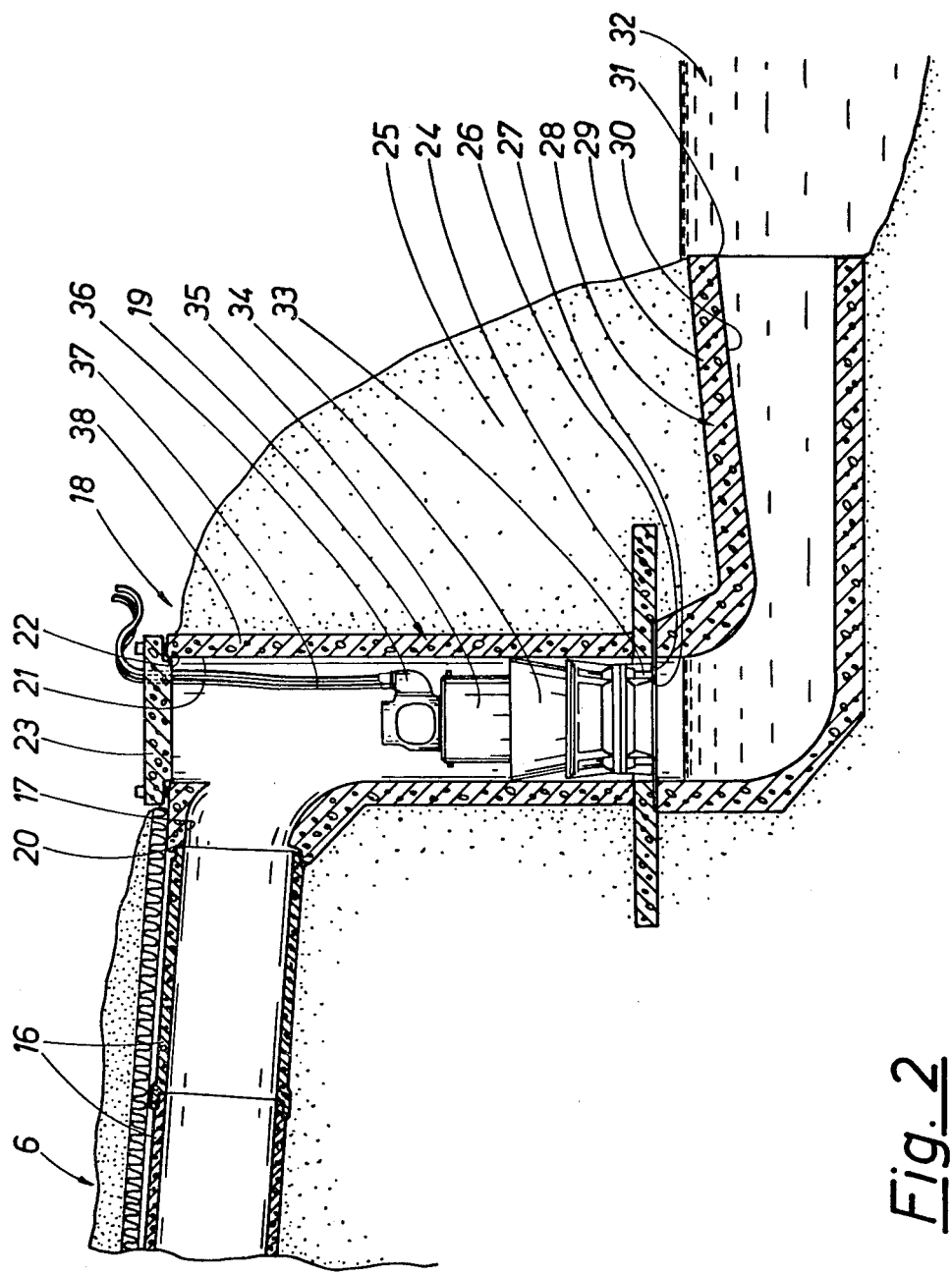
FIG. 2 illustrates the following portion of the water flow channel up to and including the discharge.

As shown in FIG. 1 a water reservoir 1 has a dam wall 2 at the rear of which a volume of water 3 is impounded. The reservoir naturally exhibits in the customary manner bottom, sides and an inlet flow, e.g. a brook or a streamlet. In front of the dam wall 2 there is a trash rack 4 which intercepts objects in the water and at the top of the dam wall there is a level monitor 5, i.e. a sensing device, which can record the water level in the body of water 3 and transmit an indicating electrical signal. From the lower portion of the dam wall an inlet tube 6 extends to a water turbine, as shown in FIG. 2. The inlet tube 6 has an inlet aperture 7 from the reservoir 1 and directly after this a valve 8 with a valve housing consisting of two concrete rings 9 and 10 together with an intermediate steel ring 11. Inside the steel ring a shaft 12 is inserted, which inside the steel ring 11 supports a valve disc 13. The shaft 12 extends outwards through the steel ring 11 and on its outside has a linkage mechanism 14 by means of which the shaft 12 and thus also the valve disc 13 can be rotated by a servomotor 15. By this means the valve disc 13 can be brought into the position shown in FIG. 1, in which it is crosswise to the flow channel and does not permit any water to pass through, up to a fully open position when it is in line with the flow channel, i.e. rotated through 90° in relation to the position illustrated in FIG. 1.

A number of concrete tubes 16 are connected to the concrete ring 10. As shown in FIGS. 1 and 2, the tubes 16 form together the draft tube to the turbine, which leads from the reservoir 1 and to an inlet aperture 17 to a flow tube 18 in which a turbine unit 19 is placed. The flow tube 18 consists of a concrete tube 37 with an upper connection chamber 20, through which the said aperture 17 extends. The tube 38 has a vertical passage 21 which forms a turbine shaft. At the top the passage 21 is terminated by an aperture 22 which is normally sealed by a cover 23. At the bottom the tube 38 is terminated by a plate 24 which is designed to distribute the pressure to the surrounding soil, denoted by 25. Level with the lower edge of plate 24 a flange 26 extends into the passage 21. The flange 26 has an aperture 27, through which the passage 21 has a connection with an underlying discharge tube 28. The discharge tube 28 has the shape of an angled concrete tube 29, the passage 30 of which forms the diffusor or the draft tube, which via an aperture 31 opens out into a recipient 32 which receives the discharged water at a level lower than that of the reservoir 1, whereby the distance between the two water levels provides the head.

Figure 3:
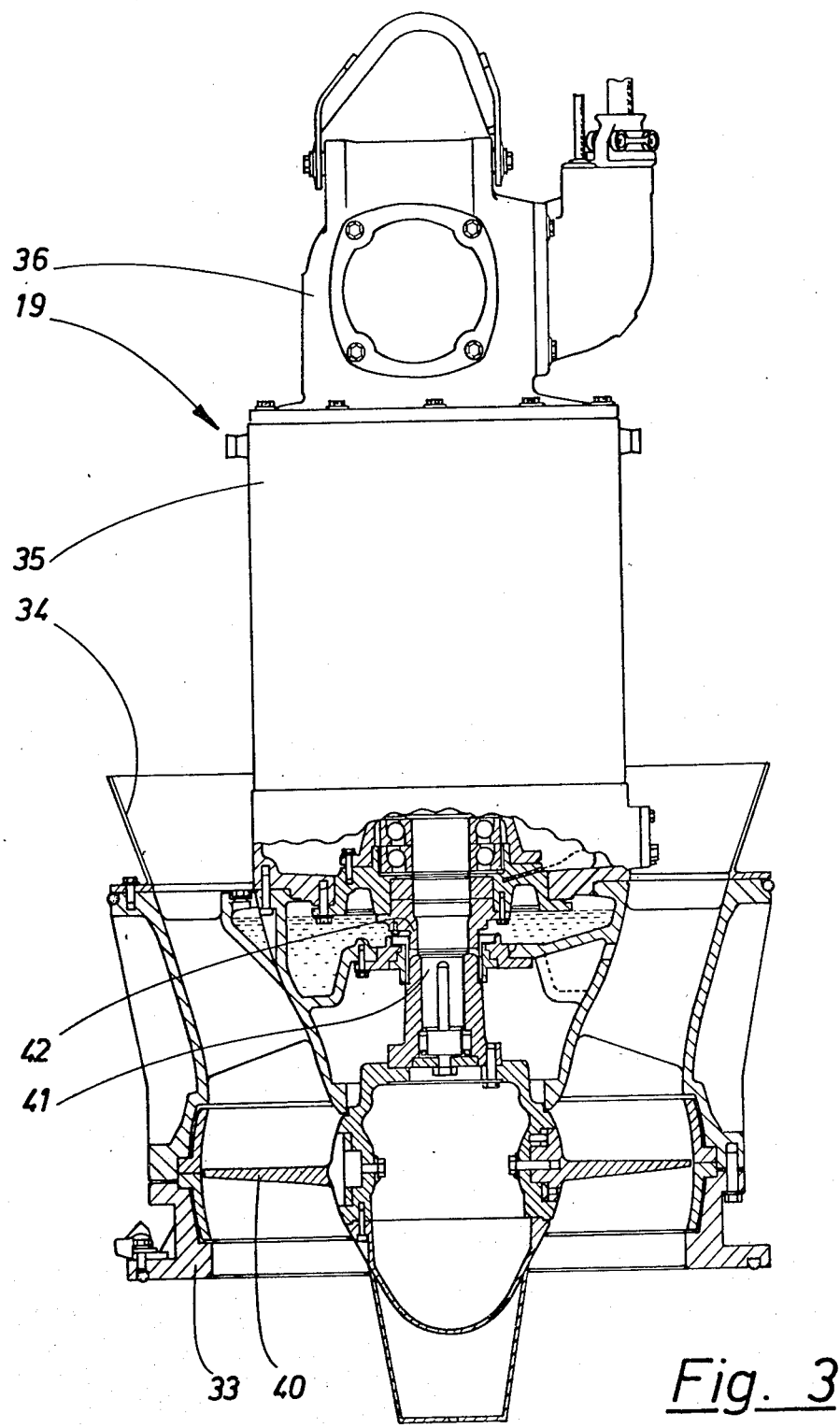
FIG. 3 shows a partial section through a turbine unit.

The turbine unit 19 located in the flow tube 18 is designed as follows. It thus has a lower supporting ring 33 which can support the turbine against the flange 26. Above the support ring 33 there is an axial turbine or propeller turbine 40 (FIG. 3) to which the water can be led by means of a hopper 34 which connects relatively closely with the passage 21. The turbine can deliver the water downwards through the aperture 27 via the supporting ring 33. The turbine can be designed in a known manner and hence it is not necessary here to specify in detail the design and location of the runner or runners. Above the runner a generator 35 is located which at its upper end has connection unit 36 for a cable 37 through which the electricity produced will be transmitted.

The rotor of the turbine and generator are both connected with a drive shaft 41 so that the rotation of the turbine brought about by the water results in rotation of the generator rotor. As shown by the diagram, the generator is located directly adjacent to the turbine and these two units together form the compact turbine plant 19. This means that the entire unit will be located in the flow of water. For this to be possible the generator must be provided with a watertight enclosure forming a housing, the exterior of which is illustrated in FIG. 2. Naturally the turbine is located outside this housing and the said drive shaft 41 passes from the turbine into the housing in which the generator rotor is situated through a watertight bushing 42, known as a rotorary seal. The connection unit 36 for the cable 37 is also watertight and the cable 37 is of the type which does not suffer damage from being located in water.

Thus during operation the turbine plant 19 is completely surrounded by water, including the electrical components. It differs from conventional units where only the turbine and a portion of the drive shaft are located in the flow of water whilst the generator and remaining electrical equipment are in a machine room outside the flow tube.

Thus the turbine unit described can be designated as "submersible", in analogy with the designation for such submersible pumps which in their entirety, including the electrical equipment, can be submerged in a body of water. Actually, with certain modifications, such a submersible pump unit can also be employed as turbine unit. This can be a major advantage in the present case, because the main aim of the invention is to provide a facility for exploiting water power at investment levels which are as low as possible and there are possibilities of satisfying this requirement precisely by employing a converted pump unit. By this means a design which has already been perfected can for the most part be employed, and relatively large production runs available can be exploited. If the basis taken is a submersible pump unit, then primarily the electrical section has to be modified from motor to generator operation. The way in which this is done is well known to the person skilled in the art and does not need to be described in greater detail here.

During installation of the turbine unit 19 the cover 23 is removed and then the unit can be dropped down into the passage 21 until it rests on the flange 26. It can be pulled upwards again just as easily for maintenance or replacement. If larger quantities of water are involved it may be feasible to arrange several turbine units parallel with each other so that a single, or only a few standard sizes can be employed for all types of installation.

A great advantage of a plant in accordance with the invention and the preceding description is that the installation and the mechanical equipment items are well separated from each other. The mechanical equipment consists of the unit 19 which, as opposed to plants of the conventional type, is not integrated in any way in the installation portion, but which represents a well-defined unit which in the simple manner described above can be placed in and removed from the installation as a whole. A further mechanical unit is the valve 8, which however is partially incorporated in the installation portion. Its incorporation applies however solely to the simple unit comprising the ring 11, shaft 12 and valve disc 13. On the other hand the closure and opening mechanism 15 is located outside the installation portion and can be designed as a separate, attachable unit. The level monitor 5 can, like this, be designed as a separate easily attachable unit.

The installation portion comprises prefabricated concrete portions, e.g. the rings 9, 10, the tubes 16, the flow tube 18 and the discharge tube 28, also sections made in-situ for forming the reservoir 1 and the recipient 32, together with a covering of soil or the like, see 25 in FIG. 2, which however at least in certain cases can be dispensed with.

Thus the entire plant can be built up from well-separated mechanical equipment and prefabricated concrete parts with relatively little in-situ construction. These circumstances lend themselves to giving low installation costs both for works, planning and consumption of materials.

To achieve the simplest control equipment, operation is preferably undertaken intermittently. Then the valve 8 operates solely in the completely closed and completely open position. When there is a need for electricity production, the valve 8 is set in the fully open position so that the turbine operates with full flow. In those cases where surplus electricity cannot be transmitted into a general network, the power output is regulated by regulating the generator, whilst the turbine is not assumed to be capable of regulation, so that its design can be made as simple as possible. The turbine can run as long as there is a requirement for power, although the level monitor 5 is so arranged that at a predetermined minimum water level in the reservoir 1 it will close the valve 8. The valve will then subsequently reopen, provided that supplies of electricity are required, once the reservoir has been refilled to a predetermined level. This mode of operation provides the simplest possible control equipment. At the same time the turbine operates only with a single flow volume, which results in reasonably high efficiency even in the case of a simple turbine design without control facilities.

I claim:

1. Arrangement for hydroelectric power plant which comprises a flow tube through which water flows during operation, at least one inlet tube for water which leads to the flow tube, at least one discharge tube for the water which leads from the flow tube, at least one turbine runner arranged in the flow tube which is driven by the water which flows through the flow tube, a drive shaft connected with the turbine runner and an electric generator connected with the drive shaft so that when the water flows through the flow tube and causes the turbine runner to rotate, the latter via the drive shaft drives the generator which thus generates electricity, in which the arrangement exhibits accentuated sub-divisioning between the mechanical unit and portions of an installation nature, so that the turbine runner and generator are located directly adjacent to each other and together with the drive shaft form a unit so arranged that the turbine runner can be in contact with a surrounding flow of water whilst the generator has a watertight enclosure into which the drive shaft extends from the turbine in a waterproof bushing and to which at least one electric cable for transmitting the electricity produced is connected by means of a watertight connection, and so that the inlet tube, the flow tube and the discharge tube are made from prefabricated concrete components, whereby the mechanical unit, as a separate unit, is located in the flow tube in which the electric cables run, and whereby the flow tube is essentially vertical and provides a support for the unit, and at its upper end has an aperture through which the unit can be passed so that the unit can be assembled in the flow tube by being passed through the said aperture and lowered down onto the support, with the mechanical unit—even in the assembled state—comprising a unit which is separate from the installation portion and which can be dismantled by being hoisted upwards from the support through the said aperture.

2. Arrangement for hydroelectric power plant as in patent claim 1 in which the unit comprises a submersible pump unit (? submersible unit originally intended for pumping purposes), the pumping device of which arranged as axial pump is employed as turbine and whose electrical motor unit is adapted to generator operation.

* * * * *